July 20, 1948.                    F. H. BOOR                    2,445,559
                                  BEVEL GEAR
Filed March 31, 1944                                          2 Sheets-Sheet 1

INVENTOR.
Francis H. Boor
BY
Stoodling and Kroot
            attys.

July 20, 1948.  F. H. BOOR  2,445,559
BEVEL GEAR

Filed March 31, 1944  2 Sheets-Sheet 2

INVENTOR.
Francis H. Boor
BY
Woodling and Krost
attys.

Patented July 20, 1948

2,445,559

UNITED STATES PATENT OFFICE 2,445,559

BEVEL GEAR

Francis H. Boor, La Fayette, Ind., assignor to Fairfield Manufacturing Company

Application March 31, 1944, Serial No. 528,847

4 Claims. (Cl. 74—459.5)

My invention relates in general to gear wheel and pinion wheel constructions and more particularly to spiral bevel gears and spiral bevel pinions.

The present invention not only retains all desirable features of standard bevel gears, but also gives important advantages which are not present in standard bevel gear.

An object of my invention is to provide a gear wheel and pinion wheel construction arranged to provide a large tooth overlap at light loads.

Another object of my invention is the provision of a tooth form in bevel gears that will produce a decreasing component of end thrust with increasing load and tooth displacement.

Another object of my invention is the provision of a tooth form in bevel gears that will operate quietly under all loads.

Another object of my invention is the provision of a spiral bevel gear having a spiral angle which is reversed or opposite from that of a standard spiral bevel gear.

Other objects and a fuller understanding of my invention may be had by referring to the following description and claims taken in conjunction with the accompanying drawing, in which:

Figure 1:
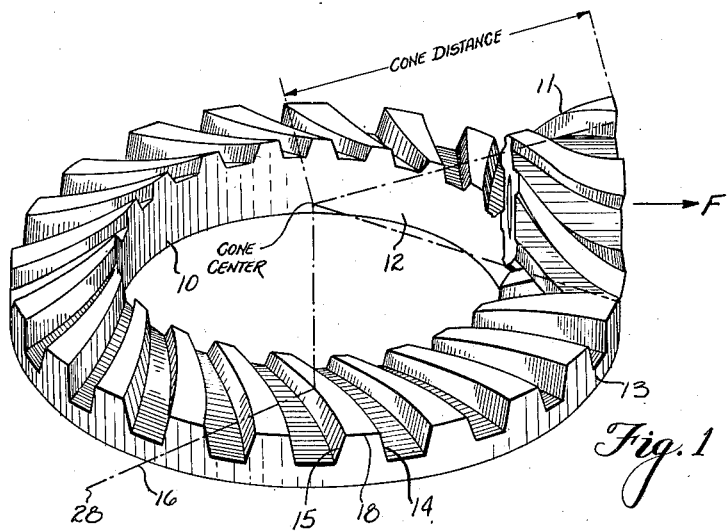
Figure 1 is a perspective view of a set of bevel gears embodying features of my invention.

With reference to the drawings, Figure 1 illustrates a combination of a spiral bevel gear 10 and a spiral pinion gear 11 embodying the features of my invention. The pinion gear 11 is constructed by the same principle as the bevel gear 10, therefore only the bevel gear is discussed hereafter.

The inner circumference 12 and the outer circumference 13 of a spiral bevel gear 10 define the limits of the tooth face area, and the reference characters 14 and 15 indicate, respectively, the convex and concave sides of a tooth 18, the tooth 18 being one of a plurality of such teeth on the tooth area.

Figure 2:
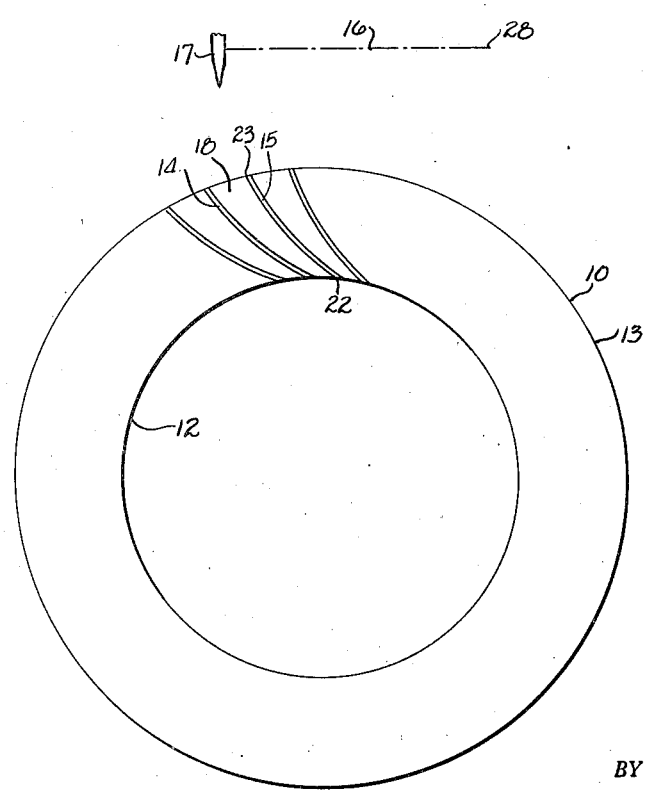
Figure 2 is a diagrammatic side view illustrating the relative position of a wheel blank and the path taken by a cutter in producing a curved tooth bevel gear wheel in accordance with the features of my invention.
Figure 3:
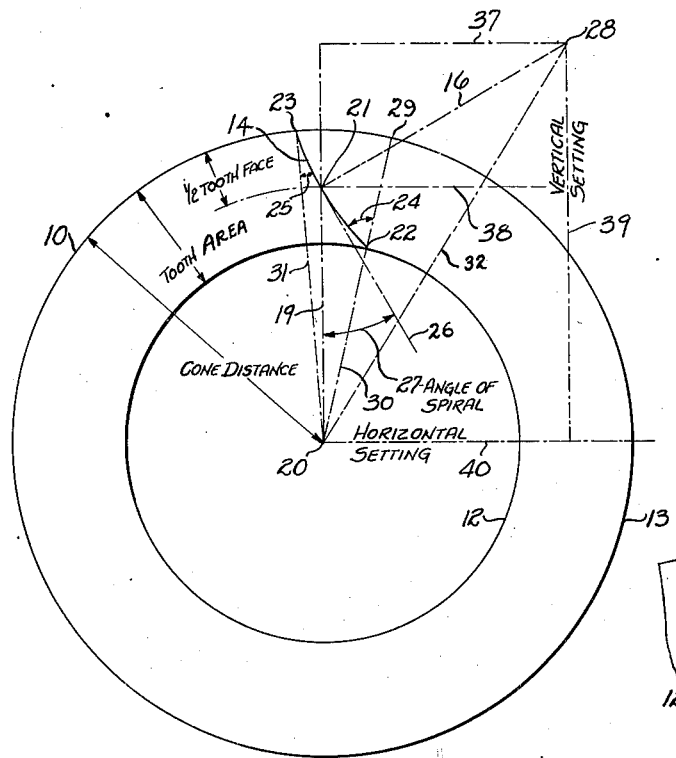
Figure 3 is a diagrammatic plan view illustrating the various construction lines used to define the angles required for setting of the tooth cutting machine.

In the Figures 2 and 3, the dot-and-dash line 16 indicates a cutter radius which in actual cutting operation may be adjustable both in length and position of origin to cut various sizes of gears and various spiral angles. The cutter radius defines the path of the cutter tool 17 in cutting the sides 14 and 15 of the tooth 18. As diagrammatically shown in Figure 3, the cutter 17 engages the outer circumference 13 at a point 23 and cuts across the area, intersecting the inner circumference 12 at a point 22. At the point of intersection 22, the tooth surface 14 makes an angle of incidence 24 with a radial line 30 passing through the point of intersection 22, and at the point of intersection 23, the tooth surface 14 makes an angle of incidence 25 with a radial line 31 passing through the point of intersection 23. The angle of incidence 24 is greater than the angle of incidence 25. An angle of incidence is defined as the angle which any line or element on the tooth surface makes with a radial line at the point of incidence.

As shown in Figure 3, the side 14 of a tooth 18 beginning at the intersection 22 of a radial line 30 and the inner circumference 12, departs circumferentially from the radial line 30 and intersects the outer circumference 13 at a point 23. It is noted that the point 23 is a circumferential distance from a point 29, the point 29 being the intersection point of radial line 30 and the outer circumference 13.

Figure 6:
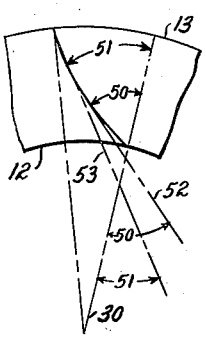
Figure 6 is a diagrammatic view illustrating the relationship of a radial line and various lines tangent to the tooth face.

In Figure 6 a tangent line 52 is drawn to the side of the tooth with its point of tangency near the inner circumference 12. The line 52 crosses the radial line 30 and defines acute angles 50 therewith.

A tangent line 53 is drawn to the side of the tooth with its point of tangency near the outer circumference 13. The line 53 crosses the radial line 30 and defines acute angles 51 therewith.

It will be noted that the angles 50 are greater than the angles 51. The acute angles between radial lines and tangent lines drawn to the sides of the teeth with their points of tangency generally disposed near the inner circumference are greater than the acute angles between radial lines and tangent lines drawn to the sides of the teeth with their points of tangency generally disposed near the outer circumference.

A tooth cut in the manner described has a reverse spiral angle 27 which is defined between a radial line 19 passing through a point 21, and a tangent line 26 drawn to the tooth surface 14 perpendicular to the radius line 16. The point 21 is located on the tooth surface 14 mid-way between the outer circumference 13 and the inner circumference 12.

For practical purposes the reverse spiral angle 27 can vary from substantially zero degrees to substantially 45 degrees. The reverse spiral angle 27 is determined by the location of the center of rotation 28 of the cutter 17 in relation to the gear blank. The gear blank during cutting operation is held in the cutting machine by means which permits the gear blank to be rotated forward or indexed a definite amount about the center 20 after one cut is finished to set the gear blank in position for the next succeeding cut. The center of rotation 28 of the cutter 17 is located a radial distance away from the center of rotation 20 of the gear blank. The radial distance is indicated by the dash-dot line 32, and has a horizontal component 40 and a vertical component 39 as indicated in Figure 3.

In standard practice, to locate the center of rotation for a cutter radius to cut a standard bevel gear having a standard spiral angle, the following equations are used:

Horizontal component equals the product of the cutter radius multiplied by the cosine of the spiral angle.

Vertical component equals the cone distance of the gear being cut, minus ½ the width of the tooth area, minus the product of cutter radius multiplied by the sine of the spiral angle.

To locate the center of rotation for a cutter radius to cut a reversed spiral angle bevel gear, as embodied in my invention, the sign preceding the last term of the equation to determine the vertical component of the radial distance to the center of rotation of the cutter in standard practice, is reversed from a negative to a positive sign which causes the result to be entirely different from the result as obtained under standard practice. The change in the sign causes the equation for the vertical component to read:

Vertical component equals the cone distance of the gear being cut, minus ½ the width of the tooth area, plus the product of the cutter radius multiplied by the sine of the spiral angle.

For the standard bevel gear, with a negative sign preceding the last term of the equation, the horizontal line 37 in Figure 3 is below the horizontal line 38. In the applicant's bevel gear the horizontal line 37 is above the horizontal line 38, and accordingly the center of rotation 28 of the cutter 17 is above the line 38, which produces the reverse spiral angle.

Figure 4:
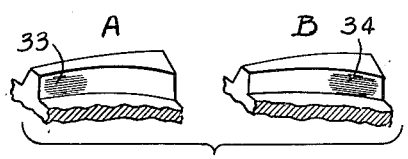
Figure 4 is a diagrammatic view of a side of a tooth showing the effect of displacement on the local area of greatest contact pressure for light and heavy load.

At light loads, the teeth of a spiral bevel gear meshing with teeth of another gear are in contact at the preferred region 33 near the inner circumference 12 as illustrated in A of Figure 4. Therefore, at light loads, with teeth cut in accordance to my invention there is a large amount of overlap between meshing teeth as a result of the large angle of incidence 24 of the tooth surface 14 in the contact region 33.

The greater the number of teeth meshing at any one instant of time, the quieter will be the operation. In my invention, therefore, a greater degree of quietness is obtained at light loads than is possible with prior art devices, because of the greater angle of incidence 24.

In practice it has been found that with spiral bevel gears of all kinds, because the meshing teeth are in contact on a sloping or wedging surface, an end thrust as illustrated by the component F of Figure 1 in my drawings, is produced under load which forces any ordinary gear housing, shafts, and mountings to displace a small amount.

With increasing load, the teeth of a spiral bevel gear meshing with the teeth of another gear are in contact at a region removed from the inner region, because of the displacement of the gear housing, shaft, and mountings as described. The effect of displacement on area of contact 34 is illustrated in B of Figure 4 as compared to A of Figure 4 which shows area of contact under light loads.

Because the end thrust is partially a result of tooth contact area being at an inclined angle with a radial line of the gear, the smaller the inclined angle, the smaller will be the portion of tooth contact pressure converted into end thrust. The ideal condition therefor, would be to have a tooth cut in such a manner that at light loads, when end thrust is necessarily small, a large amount of overlap exists to produce quietness, and as displacement under load shifts the tooth contact area, the angle that the contact surface area makes with a radial line of the gear becomes smaller.

Figure 5:
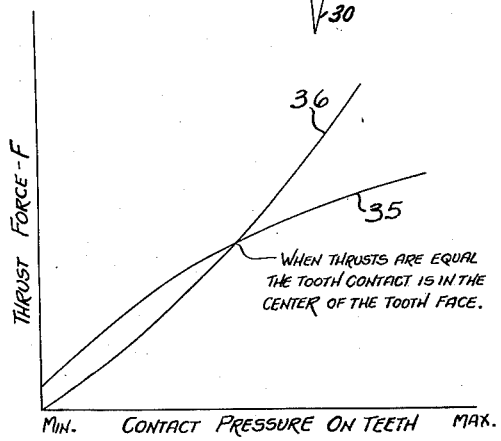
Figure 5 is a graph illustrating the relation of end thrust to tooth contact pressure on my reversed spiral bevel gear as compared to a standard spiral bevel gear.

With gears cut in accordance to my invention, as load displacement becomes greater, and driver and driven gears tend to push themselves out of mesh, the surface area at the point of greatest contact pressure lies at a progressively smaller angle with a radial line drawn through the center of rotation of the gear. The result of the described condition is a decreasing ratio of end thrust to tooth contact pressure as illustrated by line 35 of Figure 5, which indicates that the tendency to produce end thrust is a diminishing factor as the load increases.

With prior art devices, as the tooth contact area shifts as described from region 33 to region 34 of Figure 4, the angle that an element of the tooth contact area makes with a radial line of the gear increases, thus producing an even greater tendency for end thrust, which in turn produces more displacement. The result of this condition is illustrated by line 36 of Figure 5, which indicates that the tendency to produce thrust increase with each displacement, and produces an accumulating effect where each growing condition aggravates the other. It is to be noted in my invention the reverse condition is true, that is, each condition minimizes the other and keeps the end thrust to a small value under heavy loads.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In combination with a radial pinion gear, a bevelled gear wheel meshing therewith, said bevelled gear wheel having a tooth area defined by an inner circumference and an outer circumference and having a plurality of curved teeth with sides extending across the tooth area, the sides of said teeth beginning at the intersection of a radial line and the inner circumference and departing circumferentially from the radial line and intersecting the outer circumference at a circumferential distance from said radial line, the acute angles between the radial line and a tangent drawn to the sides of the teeth near the inner circumference being greater than the acute angles between the radial line and a tangent drawn to the sides of the teeth near the outer circumference.

2. In combination with a radial pinion gear, a bevelled gear wheel meshing therewith, said bevelled gear wheel having a tooth area defined by an inner circumference and an outer circumference and having a plurality of curved teeth with sides extending across the tooth area, the said sides of the teeth having substantially equal radii of curvature, the sides of said teeth beginning at the intersection of a radial line and the inner circumference, and departing circumferentially from the said radial line and intersecting the outer circumference at a circumferential distance from said radial line, the acute angle between the radial line and a tangent drawn to the sides of the teeth near the inner circumference being greater than the acute angle between the radial line and a tangent drawn to the sides of the teeth near the outer circumference.

3. In combination with a radial pinion gear, a bevelled gear wheel meshing therewith, said bevelled gear wheel having a tooth area defined by an inner circumference and an outer circumference and having a plurality of curved teeth with sides extending across the tooth area intersecting said inner circumference and departing circumferentially from a radial line and intersecting the outer circumference at a circumferential distance from said radial line, the angle of incidence of the sides of said teeth in relation to the inner circumference being greater than the angle of incidence of the said teeth in relation to the outer circumference.

4. A bevel gear wheel for a radial pinion gear, said bevel gear wheel having a tooth area defined by an inner circumference and an outer circumference having centers in common, said bevel gear wheel having a plurality of curved teeth with sides extending across the tooth area, the sides of the teeth having substantially equal radii of curvature generated from a point or points located a radial distance from the said common center of the said circumferences, the said radial distance having a first and a second component substantially at right angles with each other, the first component being equal to the product of the length of the said radii of curvature multiplied by the cosine of the spiral angle, and the second of said components being equal to the length of the cone distance minus ½ the width of the tooth area, plus the product of the length of the said radii of the curvature multiplied by the sine of the spiral angle.

FRANCIS H. BOOR.

REFERENCES CITED

The following references are of record in the file of this patent:

UNITED STATES PATENTS

| Number | Name | Date |
|---|---|---|
| 1,295,231 | Stewart et al. | Feb. 25, 1919 |
| 1,748,813 | Wildhaber | Feb. 25, 1930 |
| 2,028,143 | Elbertz | Jan. 21, 1936 |

OTHER REFERENCES

Automotive Industries Issue of Mar. 21, 1936, p. 446.